2,948,711
Patented Aug. 9, 1960

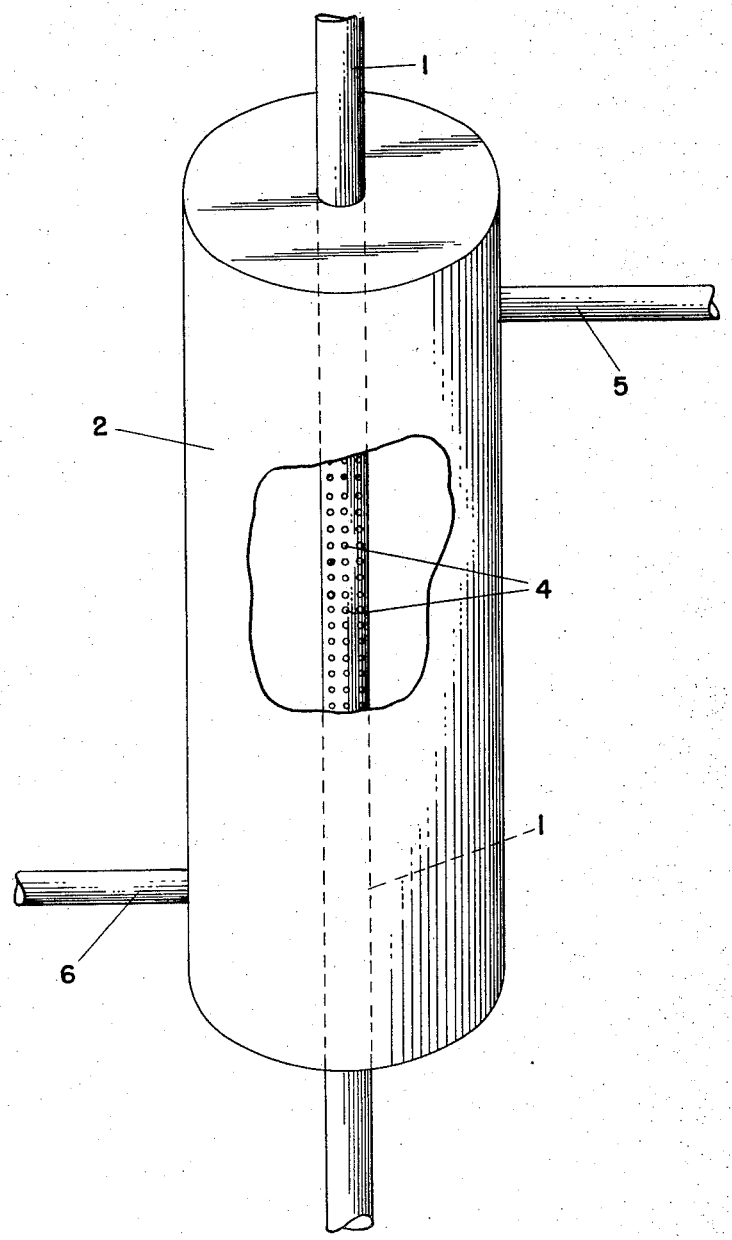

2,948,711

PREPARATION OF POLYOLEFINS

Robert M. Kennedy, Newtown Square, Pa., assignor to Sun Oil Company, Philadelphia, Pa., a corporation of New Jersey Filed Nov. 27, 1956, Ser. No. 624,697

8 Claims. (Cl. 260—88.2)

This invention relates to the preparation of polymers of normally gaseous olefins, and particularly relates to the preparation of solid polymers of ethylene, solid polymers of propylene, and solid copolymers of ethylene and propylene.

Normally gaseous olefins can be polymerized by a variety of catalysts. A catalyst which is especially effective for the polymerization of normally gaseous olefins to relatively high molecular weight, solid polymers is the combination of a lower chloride of titanium and an aluminum trialkyl, such as aluminum triethyl. This catalyst can be prepared by admixing, for example, titanium tetrachloride and aluminum triethyl in an inert solvent such a isoctane. On admixing the two components, a finely divided solid phase is formed as a dispersion in the inert solvent. If desired, a lower halide such as titanium trichloride can be preformed, dispersed in an inert liquid, and an activator such as aluminum trialkyl added. This solid phase acts as a catalyst for polymerizing normally gaseous olefins to solid polymers. In performing the polymerization step, a normally gaseous olefin is contacted with the solid catalyst, such as by passing the olefin through a suspension of the finely divided solid in the inert solvent, and is thereby polymerized to solid polymers. Other materials can be substituted for the aluminum triethyl, as hereinafter described. Anhydrous and oxygen-free conditions are used throughout the process, since the catalyst is deactivated by contact with water or oxygen.

However, in this process, the solid catalyst particles are intimately associated with, and dispersed throughout, the solid polymer product. The separation of polymer from catalyst is extremely difficult. Means for separating catalyst from polymer involving grinding the polymer-catalyst in the presence of a catalyst-deactivating material such as water or alcohol to expose the dispersed catalyst particles to the action of such deactivating material, and simultaneously or subsequently extracting the deactivated catalyst are unsatisfactory. Such means are unsatisfactory in that removal of even a major proportion of the catalyst is difficult, and substantially complete removal of contaminating deactivated catalyst is not achieved.

It has now been found that by initiating polymerization of a normally gaseous olefin on only a portion of the solid surface of catalyst particles while mechanically blocking the remaining portion of the surface of such particles from the polymerization reaction mixture, such remaining portion, after the polymerization reaction, can be contacted with a solvent for the catalyst particles so that the entire particle is dissolved, leaving the polymer free from catalyst.

Attention is now directed to the accompanying figure which illustrates an apparatus for performing an embodiment of the invention.

Tube 1 extends through container 2. A multiplicity of apertures 4 are located in the portion of tube 1 positioned within container 2. The size of the apertures are such that at least a substantial proportion of solid catalyst particles will not pass therethrough. If desired, a portion of tube 1 within container 2 can be constructed of a fine mesh screen thereby presenting a maximum number of perforations 4. Conduits 5 and 6 provide means for introducing liquid and/or gas into container 2. In operation, catalyst particles are positioned, or seated, in apertures 4. This can be accomplished, for example, by filling tube 1 with a slurry of catalyst particles in an inert liquid while maintaining a reduced pressure in container 2. In effect, the catalyst particles are filtered out by apertures 4, and remain seated therein, while a portion of the inert liquid is removed through conduit 6. Any excess slurry is drained from tube 1. Other means of positioning catalyst particles 4 can be employed. For example, titanium tetrachloride in liquid phase can be flowed through tube 1 so that films thereof cover apertures 4. These films are then contacted with an aluminum trialkyl such as by introducing a solution of an aluminum alkyl in an inert hydrocarbon into tube 1 and/or container 2. The resulting particles are firmly positioned in apertures 4 and substantially block fluid communication through the apertures. The so-formed catalytic member, i.e., tube 1 with apertures 4 blocked with catalyst particles, is especially effective for use in the polymerization process of the invention.

In performing the polymerization step, a normally gaseous olefin is contacted with the catalyst surfaces exposed through apertures 4, i.e., the olefin is introduced into container 2 and therein has access to and contacts that portion of the solid catalyst particles which are exposed through apertures 4. The olefin is conveniently introduced through conduit 6 as a solution in an inert reaction medium. The inert liquid medium and unreacted olefin, if any, are removed through conduit 5. It is advantageous to maintain a positive pressure in tube 1 with respect to the pressure in container 2, i.e., a pressure at least equal to the pressure in container 2. This can be accomplished by introducing an inert gas such as nitrogen, argon, helium, hydrogen, methane or ethane into tube 1 and maintaining the inert gas at a pressure slightly above the pressure in container 2, or by introducing an inert liquid into tube 1 to maintain substantially the same pressure within tube 1 as at adjacent locations in container 2. As the polymerization proceeds, polymer is built up on the portion of catalyst particles exposed through apertures 4. When the polymerization reaction ceases or has reached a desired value, the reaction is stopped and container 2 is preferably drained. A catalyst deactivating material which is also preferably a catalyst solvent is then introduced into tube 1. That portion of the solid catalyst surface facing into tube 1, and which was not exposed to the polymerization reaction components, contacts the introduced liquid so that the catalyst particles are dissolved completely from the apertures and from the solid polymer. Solid polymer is then removed from container 2 by any convenient means, such as by flushing or removing and scraping tube 1.

Saturated hydrocarbons are preferably used as the inert liquid reaction medium of the polymerization process. Paraffins such as the hexanes, heptanes, octanes, decanes, mixtures thereof and the like, and cycloparaffins such as the cyclopentanes, cyclohexanes, and mixtures thereof with each other and with paraffins give excellent results.

The normally gaseous olefins which can be used in the process of the invention are ethylene, propylene, and mixtures of ethylene and propylene. Saturated hydrocarbons such as ethane and propane can be present and act as diluents. The normally gaseous olefins can be from any source, such as from petroleum refinery streams, from the dehydration of alcohol, or the like.

The polymerization reaction is performed under polymerizing conditions, including a temperature within the range of from about 0° C. to 250° C. and a pressure of from about atmospheric to about 5,000 p.s.i.g. (pounds per square inch gauge), it being necessary that the inert liquid reaction medium be maintained in the liquid phase.

The catalyst used in the polymerization is preferably a halide of titanium as above described, but other halides and salts of a metal of the left hand side of group IV, V, or VI of the periodic table can be employed. Preferably a halide or salt of titanium, zirconium, hafnium, vanadium, niobium, chromium, molybdenum or tungsten is used. The metal of the metal compound must be in a valence other than its highest valence state. The reduction of a metal compound such as titanium tetrachloride can be accomplished by any convenient means. As above described, an aluminum trialkyl can be used as the reducing agent, or other reducing means such as by contacting the metal compound with a dispersion of an alkali metal in an inert solvent can be used. It is necessary, however, that an activator such as an aluminum trialkyl be present as a component of the catalyst, and it is convenient in many instances to employ such a compound as both the reducing agent and the activator. However, the use of a prereduced metal compound, such as $TiCl_3$ or $TiCl_2$, together with an activator, gives excellent results. Materials which can be used as the activator, in addition to aluminum trialkyls, include other metal alkyls, metal hydrides, metal borohydrides and alkyl metal halides. Suitable metal alkyls include alkyl derivatives of aluminum, zinc, beryllium, chromium, magnesium, lithium and lead. Aluminum triethyl, aluminum triisopropyl, aluminum triisobutyl, and the magnesium and zinc analogues thereof give good results in the process and are preferred, but metal alkyls having up to about 12 carbon atoms in the alkyl groups can be used with good results. Alkali metal alkyls such as n-butyllithium, methylsodium, butylsodium, phenylisopropylpotassium, and the like, also illustrate metal alkyls that give good results in the process. Metal hydrides which can be used as polymerization activators include, for example, lithium hydride, lithium aluminum hydride and sodium hydride. Metal borohydrides such as sodium borohydride and potassium borohydride illustrate the borohydrides which can be used. Alkyl metal halides which can be used are Grignard reagents such as methylmagnesium bromide, ethyl magnesium chloride, phenylmagnesium bromide, and the like.

The quantity of activator to use can be varied and good results obtained. Generally a mole ratio of metal compound to activator of from 1:10 to 10:1 gives good results when the metal compound is prereduced or is reduced by the activator.

After performing the polymerization step, a catalyst deactivator and solvent is contacted with the exposed catalyst particle surfaces. Dilute solutions of mineral acids such as hydrochloric acid, nitric acid and sulfuric acid give good results. Preferably hydrochloric acid of from 25% to 50% strength is used. Such acids can be used together with alcohols such as methanol and ethanol if desired, and good results obtained.

In order to illustrate a specific embodiment of the process of the invention, a slurry prepared by admixing 30 parts of $TiCl_3$ crystals in 100 parts of isooctane is introduced into a tube which extends through a concentric container therefor, the apparatus being substantially as above described. As used herein, "parts" refers to parts by weight. The tube has a multiplicity of apertures located in a portion of the tube within the container. A vacuum is applied to the container to induce liquid flow through the apertures, from the tube to the container. Isooctane is removed from the container until the flow substantially ceases due to pluggage of the apertures by the solid $TiCl_3$ crystals. Excess slurry is then drained from the tube, about 12 parts of $TiCl_3$ being recovered, and the tube refilled with isooctane to maintain a static pressure therein. Isooctane containing about 8 parts of aluminum triisopropyl is then introduced into the container in contact with the surfaces of the catalyst particles exposed through the tube apertures. Isooctane containing about 6% by weight of dissolved propylene is then introduced into the lower portion of the container, and passed upwardly therein so that excess aluminum triisopropyl is flushed from the container. The flow of propylene in isooctane is continued with the propylene in contact with the tube and the activated surfaces of the $TiCl_3$ particles which are exposed through the apertures. The rate of flow of the propylene solution is adjusted so that about 60 parts per hour of propylene is introduced into the container. The temperature of the reaction is maintained at about 90° C. and a pressure of slightly above atmospheric is used throughout. After about 2 hours, the reaction is stopped and both the container and tube drained. A 25% solution of hydrogen chloride in methanol is then introduced into the tube to contact the surfaces of the catalyst particles positioned in the apertures. After about 20 minutes the tube containing adhered polymer is removed from the container and scraped. About 105 parts of white fluffy polypropylene solid having a density of about 0.91 and a molecular weight of about 200,000 as determined by viscosity measurements of solutions thereof in hexahydronaphthalene are recovered.

Other embodiments of the present invention will be apparent to those skilled in the art. For example, an inert liquid reaction medium such as isooctane can be maintained in the container while propylene is bubbled therethrough.

Solid polymer products of the invention are useful for the preparation of containers for corrosive fluids, conduits for the transportation of liquids, films for packaging food materials, and the like. Such articles can be prepared by molding, extrusion, or other fabrication processes.

The invention claimed is:

1. Process for the preparation of solid polymers of normally gaseous olefins which comprises contacting, under polymerizing conditions, a normally gaseous olefin with surfaces of solid particles of a catalyst consisting essentially of (A) a halide of a metal selected from the group consisting of titanium, zirconium, hafnium, vanadium, niobium, chromium, molybdenum, and tungsten in combination with (B) a metallic reducing agent therefor wherein the metal of said metal halide is present in a valence state other than its highest valence state, said catalyst particles being positioned in a multiplicity of apertures in a tubular conduit, whereby fluid communication through said apertures is blocked, said contacting occurring on only one side of said tubular conduit, whereby polymer formation occurs on the contacted surfaces of the solid catalyst particles, and subsequently contacting surfaces of the solid catalyst particles not exposed to polymer formation with a solvent for the catalyst particles, thereby dissolving said catalyst particles without dissolving the solid olefin polymer.

2. Process according to claim 1 wherein the normally gaseous olefin is a mixture of ethylene and proplyene.

3. A process as defined by claim 1 wherein said normally gaseous olefin is ethylene.

4. A process as defined by claim 1 wherein said normally gaseous olefin is propylene.

5. A process as defined by claim 1 wherein said solvent is an aqueous mineral acid.

6. A process as defined by claim 1 wherein said solvent is an alcoholic solution of a mineral acid.

7. A process as defined by claim 1 wherein said catalyst particles are positioned in a multiplicity of apertures in said conduit by forming films of liquid titanium tetrachloride over a multiplicity of apertures in said conduit wall and contacting said films with an aluminum trialkyl whereby solid particles of lower halides of titanium are formed in said apertures and block fluid communication through said apertures.

8. Process as defined by claim 1 wherein said catalyst particles are positioned in said apertures by passing a slurry of titanium trichloride crystals through said apertures and positioning said crystals in said apertures until fluid communication through said apertures is blocked whereupon a solution of an aluminum trialkyl is contacted with said catalyst crystal surfaces which are to be contacted with the olefin monomer used in preparing the olefin polymer.

References Cited in the file of this patent

UNITED STATES PATENTS

| | | |
|---|---|---|
| 2,079,935 | Frey | May 11, 1937 |
| 2,691,647 | Field et al. | Oct. 12, 1954 |
| 2,692,257 | Zletz | Oct. 19, 1954 |
| 2,692,258 | Roebuck et al. | Oct. 19, 1954 |
| 2,721,189 | Anderson et al. | Oct. 18, 1955 |
| 2,881,156 | Pilar et al. | Apr. 7, 1959 |

FOREIGN PATENTS

| | | |
|---|---|---|
| 526,101 | Italy | May 14, 1955 |
| 538,782 | Belgium | Dec. 6, 1955 |

OTHER REFERENCES

Perry: Chem. Eng. Handbook, McGraw-Hill (1950), pages 1257–8.